(12) United States Patent
Lorenz et al.

(10) Patent No.: US 9,981,547 B2
(45) Date of Patent: May 29, 2018

(54) FUEL TANK OF THERMOPLASTIC MATERIAL AND METHOD FOR THE PRODUCTION THEREOF

(71) Applicant: Kautex Textron GmbH & Co. KG, Bonn (DE)

(72) Inventors: Harald Lorenz, Bad Neuenahr-Ahrweiler (DE); Fabio Tensi, Troisdorf (DE); Hilmar Schichlein, Bonn (DE); Marcel Krueger, Bonn (DE)

(73) Assignee: KAUTEX TEXTRON GMBH & CO. KG, Bonn (DE)

( * ) Notice: Subject to any disclaimer, the term of this patent is extended or adjusted under 35 U.S.C. 154(b) by 0 days. days.

(21) Appl. No.: 14/415,998

(22) PCT Filed: Mar. 15, 2013

(86) PCT No.: PCT/EP2013/000794
§ 371 (c)(1),
(2) Date: Jan. 20, 2015

(87) PCT Pub. No.: WO2014/012604
PCT Pub. Date: Jan. 23, 2014

(65) Prior Publication Data
US 2015/0210160 A1    Jul. 30, 2015

(30) Foreign Application Priority Data
Jul. 19, 2012   (DE) ................. 10 2012 014 272

(51) Int. Cl.
*B60K 15/035* (2006.01)
*B60K 15/073* (2006.01)
(Continued)

(52) U.S. Cl.
CPC ...... *B60K 15/03519* (2013.01); *B29D 22/003* (2013.01); *B60K 15/035* (2013.01);
(Continued)

(58) Field of Classification Search
CPC .......... B60K 15/03519; B60K 15/035; B60K 15/073; B60K 15/03006;
(Continued)

(56) References Cited

U.S. PATENT DOCUMENTS 6,338,420 B1 * 1/2002 Pachciarz ........ B60K 15/03177
220/4.13
7,047,949 B2   5/2006 Reiter et al.
(Continued)

FOREIGN PATENT DOCUMENTS

DE        9111920 U1     1/1992
DE       20011883 U1    10/2000

OTHER PUBLICATIONS

English language PCT International Search Report dated May 23, 2013, received in corresponding PCT Application No. PCT/EP13/00794, 2 pgs.
(Continued)

*Primary Examiner* — Andrew T Kirsch
*Assistant Examiner* — Jennifer Castriotta
(74) *Attorney, Agent, or Firm* — Grossman, Tucker, Perreault & Pfleger, PLLC

(57) ABSTRACT

A fuel tank of thermoplastic material for motor vehicles comprising at least one line of thermoplastic material, which extends between at least two fixed connection points on the tank wall inside the tank, the fuel tank being distinguished by the fact that the line is supported at at least one location or over at least one portion between its connection points against the force of the weight acting in the fitted position to prevent sagging and that the line is formed and/or routed (Continued)

Figure 1:
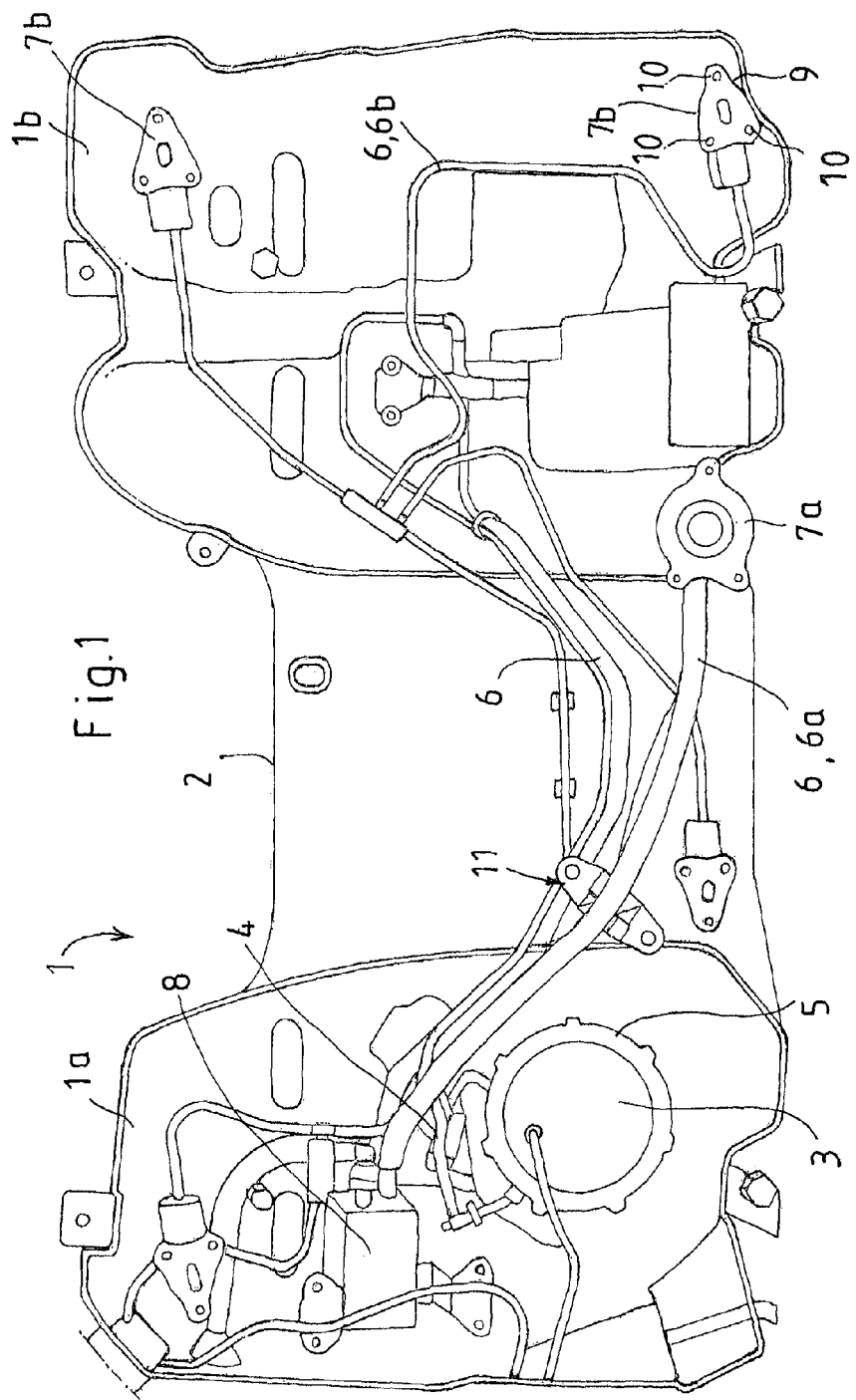

and/or suspended such that an increase in the length of the line brings about a compensating movement of the line transversely to the direction of the force of the weight.

6 Claims, 5 Drawing Sheets

(51) Int. Cl.
*B29D 22/00* (2006.01)
*B60K 15/03* (2006.01)

(52) U.S. Cl.
CPC ...... *B60K 15/03006* (2013.01); *B60K 15/073* (2013.01); *B60K 2015/03026* (2013.01); *B60K 2015/03032* (2013.01); *B60K 2015/03256* (2013.01); *B60K 2015/03528* (2013.01); *Y10T 156/1002* (2015.01)

(58) Field of Classification Search
CPC ........... B60K 2015/03026; B60K 2015/03032; B60K 2015/03256; B60K 2015/03528
USPC ...................................... 220/651, 4.13, 4.14
See application file for complete search history.

(56) References Cited

U.S. PATENT DOCUMENTS

| | | | |
|---|---|---|---|
| 7,318,445 | B2 | 1/2008 | Ohshiro et al. |
| 8,122,604 | B2* | 2/2012 | Jannot .................... B60K 15/03 220/4.13 |
| 8,276,778 | B2 | 10/2012 | Eulitz et al. |
| 2005/0039728 | A1 | 2/2005 | Krogull et al. |
| 2005/0172999 | A1 | 8/2005 | Ohshiro et al. |
| 2008/0224363 | A1 | 9/2008 | Criel et al. |
| 2009/0065513 | A1 | 3/2009 | Kraemer |
| 2009/0230133 | A1* | 9/2009 | Takeuchi ............... B60K 15/03 220/562 |
| 2009/0308881 | A1 | 12/2009 | Eulitz et al. |
| 2013/0192703 | A1* | 8/2013 | Hochstein ........ B60K 15/03519 137/574 |

OTHER PUBLICATIONS

English language PCT Written Opinion dated May 23, 2013, received in corresponding PCT Application No. PCT/EP13100794, 5 pgs.
English language PCT International Preliminary Report on Patentability dated Jul. 9, 2014, received in corresponding PCT Application No. PCT/EP13/00794, 6 pgs.

* cited by examiner

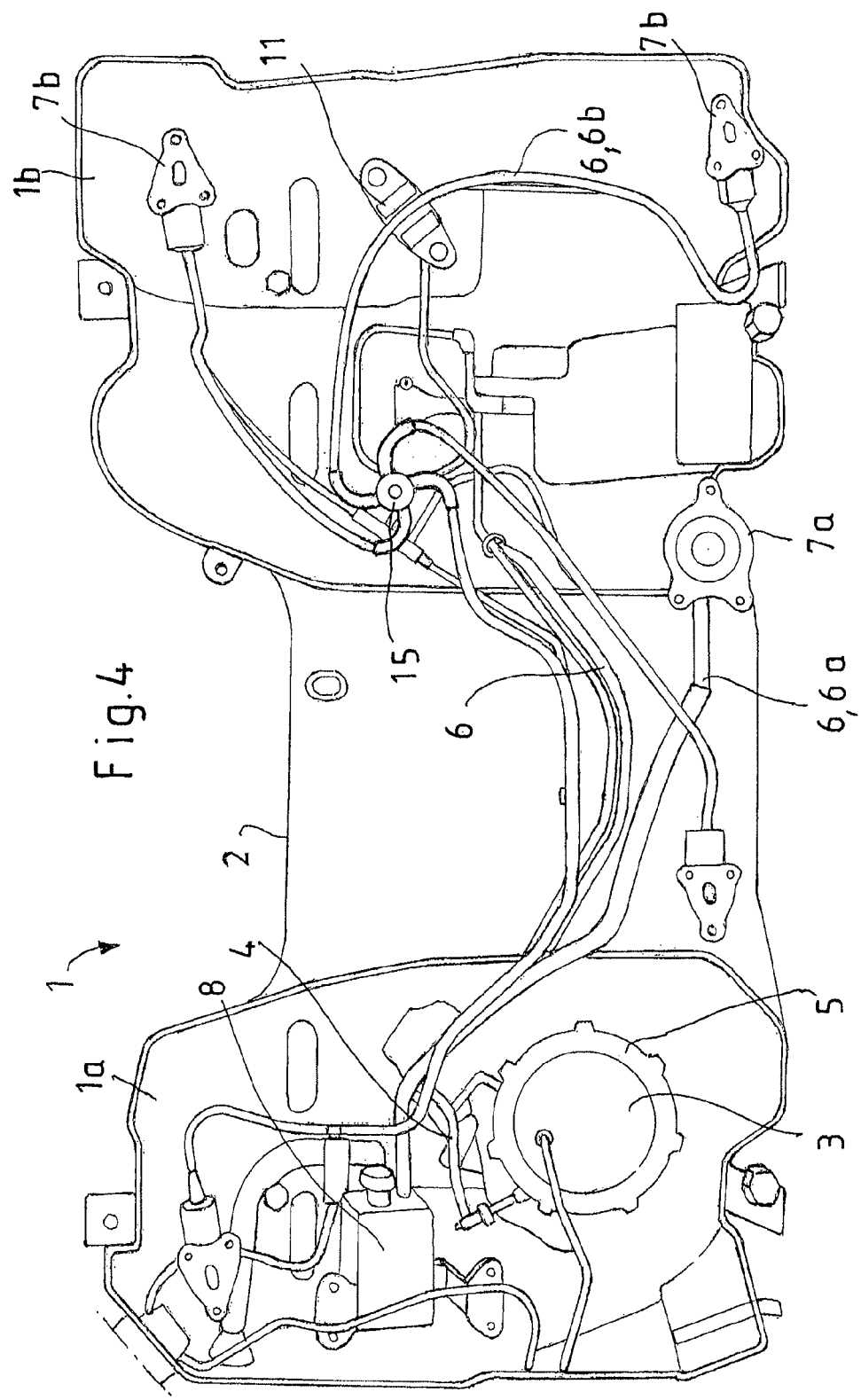

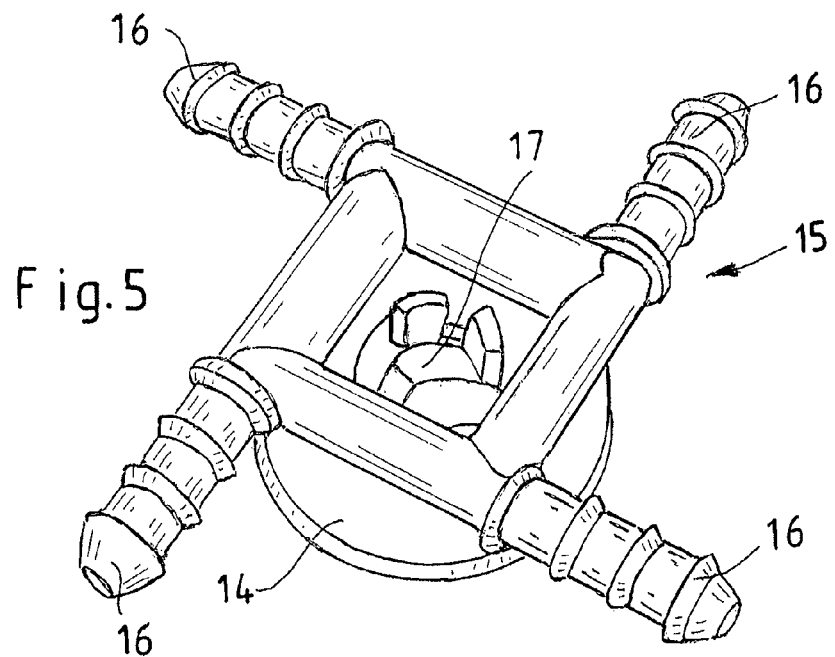
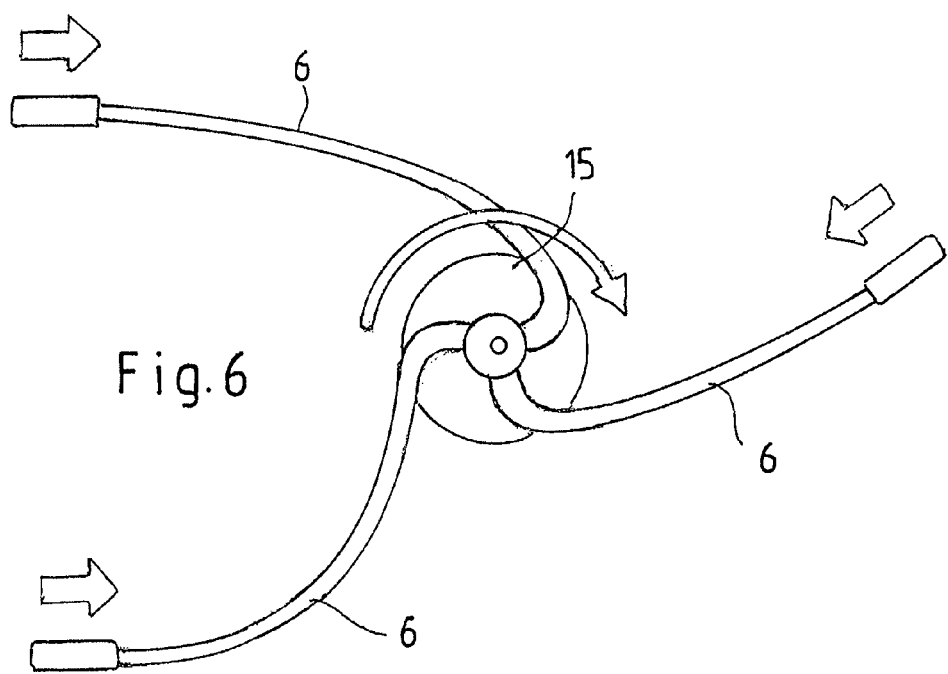

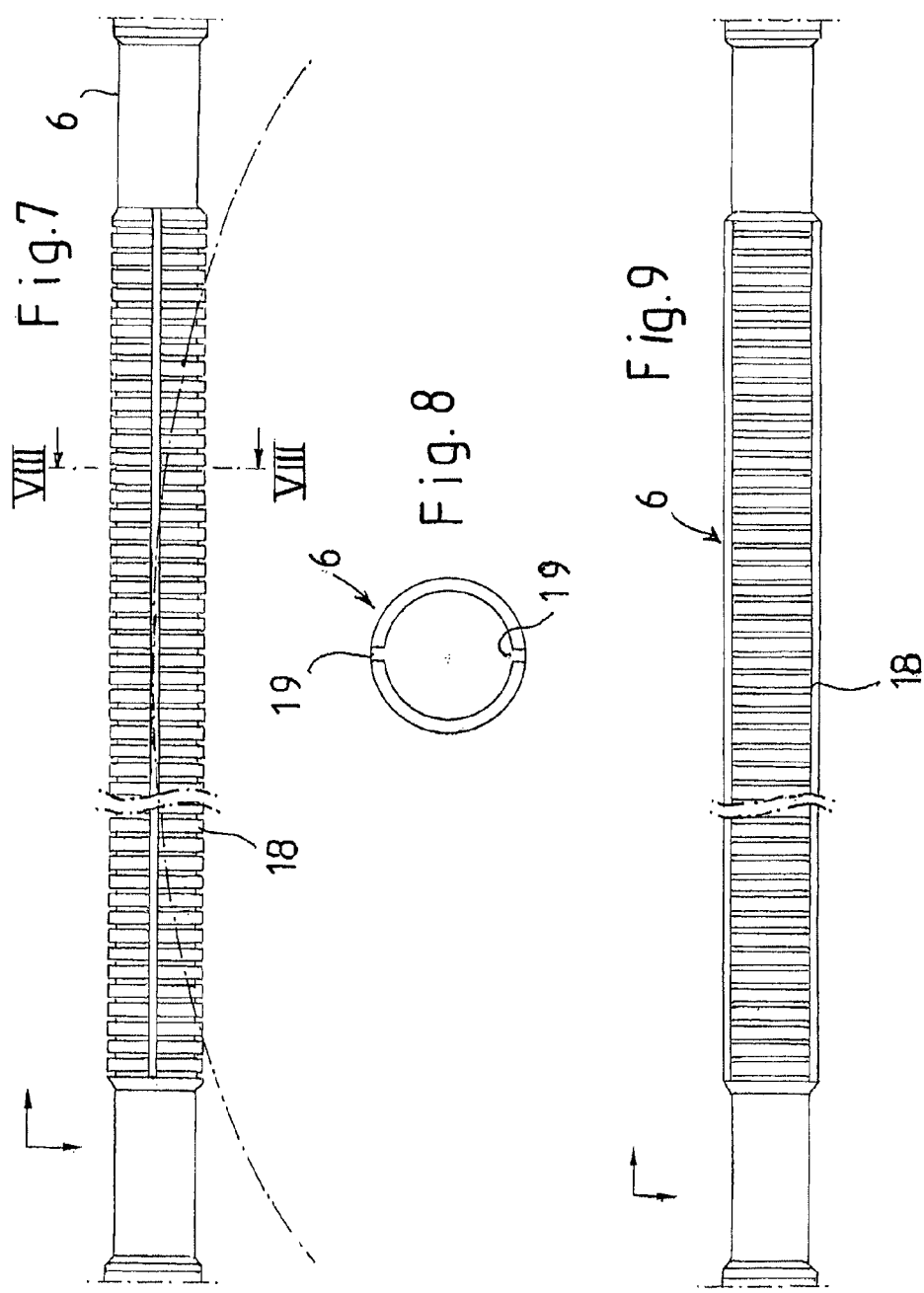

FUEL TANK OF THERMOPLASTIC MATERIAL AND METHOD FOR THE PRODUCTION THEREOF

The invention relates to a fuel tank of thermoplastic material for motor vehicles comprising at least one line of thermoplastic material, which extends between at least two fixed connection points on the tank wall inside the tank. Such a fuel tank and a method for the production thereof are known for example from WO 2006/095024 A1.

Fuel tanks for motor vehicles must always be designed as gas- and liquid-tight systems, which as far as possible give off no hydrocarbon emissions into the atmosphere. Any excess pressure in the tank is equalized by means of venting lines, which communicate with the atmosphere by way of one or more fuel vapor filters, so that only gas stripped of hydrocarbons enters the atmosphere.

Modern fuel tanks predominantly consist of thermoplastic materials based on HDPE (High-Density Polyethylene), which is essentially not resistant to hydrocarbon diffusion and, in contact with hydrocarbons, has a certain tendency to swell. In order to ensure that fuel tanks of thermoplastic material do not allow any emissions, they are formed from multi-layer plastic coextrudates that comprise barrier layers for hydrocarbons. To be able to provide openings and connections as well as lead-throughs in the tank wall, it is unavoidably necessary to breach the integrity of the barrier layer of the tank at one or other location of the tank, additional measures having to be provided at such locations to seal the system against escaping hydrocarbons.

To keep the number of required openings and lead-throughs on the tank and the number of attachment locations on the tank down as much as possible, a change has taken place in favor of laying fuel lines, venting lines and other functional components required for the operation of the "fuel tank" system inside the fuel tank.

These often branched systems of lines in the form of spiders of lines may for example be introduced through an inspection opening in the tank after production of the tank, although a change has taken place in favor of attaching these line arrangements already during the production of the tank during the molding thereof inside the tank to the still warm tank walls in the plastic state bounding the tank.

For example, a fuel tank according to the invention may be produced by extruding preforms in web or strip form, in order to mold them in a multi-part extrusion blow-molding tool in a first step to form shell-shaped intermediate products. In a further step, inserts, line arrangements and the like are introduced into the still warm-plastic intermediate products. The half-shells fitted out in this way are then joined together in a further method step to form the completely closed fuel tank.

Venting valves, filling-level sensors, one or more feed units and suction jet pumps are provided for example inside the tank as inserts. The venting lines usually extend inside the tank between venting points that are at the top in the fitted position of the tank and at which operational venting valves or else refueling venting valves may be provided for example. The position of the venting points in the fuel tank is governed by the contour of the fuel tank, which often comprises a number of part-volumes connected to one another in stages and the design of which is adapted to the situation where it is fitted in the motor vehicle. It follows from this that the equalizing volume remaining in the fuel tank during refueling may be arranged above the level of the fuel in various parts-volumes of the fuel tank at different levels at different locations. Venting lines that are connected to one another by means of a spider of lines or by means of one or more less rigid line(s) of plastic are provided in these upper regions of the fuel tank.

In the production of fuel tanks by extrusion blow molding, in which the tank is re-shaped and molded in the first heat of the molten thermoplastic material, there is an appreciable distortion due to shrinkage, of the order of about 3%, after the plastic has set and the tank has been demolded. After the filling of the fuel tank, a certain swelling of the plastic occurs, partly compensating again for the shrinkage.

To equalize the distortion due to shrinkage, it is proposed in WO 2006/065024 A1 to form the line extending between two connection points in an S-, V- or W-shaped manner or with a line loop between the connection points and to pretension or pre-stretch the line before it is attached to the preform concerned, so as to compensate for the subsequent shrinkage during the cooling down of the plastic. This prevents the line from sagging after completion of the fuel tank, which is undesirable for a wide variety of reasons. It may for example happen in this case that lever-type sensors located in the fuel tank are blocked by the sagging lines.

The attachment of the connection points in the form of valve housings, for example, takes place by riveting or welding the parts concerned to the preform previously molded in the tool.

If the line is attached to the preform, for example welded or riveted to it, while under tension by being pre-stretched, the tension exerted via the line can be transferred to the connection points, which may have adverse effects during the welding on the quality of the welded connection. It goes without saying that this also applies to other types of connection that have to be produced under load.

EP 1 504 943 A2 discloses a fuel tank including a condensate collector of a venting line with a closure lid where the condensate collector forms a structural unit with the closure lid. The closure lid closes off an opening in the wall of the fuel tank. The condensate collector has spring elements for prestressing elastic venting lines against the inside of the fuel tank and the venting device can be mounted through the opening in the fuel tank.

US 2009/0308881 A1 relates to a method for producing fuel containers and to a fuel container for motor vehicles. The method comprises the extrusion of web-type preforms, the shaping of the preforms in the first heat of the extrudate in a multi-part moulding tool to form shell-shaped intermediate products in a first step, and to form a one-piece, closed container in the same moulding tool in a second step. At least one fuel tank filling or operational venting device is being fastened to the inner wall of at least one intermediate product between the first and second step in such a manner that at least one preassembled part of the tank-filling or operational venting device with at least one connection fitting, at least one vent line and at least one functional component is connected to the inner wall by a material and/or for-fitting joint in work cycle, the wall of the intermediate product being penetrated by the connection fitting during assembly, with the use of at least one conduit section of variable length as a part of the vent line.

US 2005/0172999 A1 discloses a fuel vapor pipe structure including a plurality of cut valves for passing or cutting a fuel vapor at inside of a fuel tank, a pipe joint connected to the cut valves for communicating with the fuel vapor to a canister, and a resin tube for connecting the cut valve and the pipe joint. The resin tube is bent by making a length of the resin tube longer than a length of connecting connection tube portions of the cut valve and connection tube portions of the pipe joint so as to compensate dimensional tolerances between the connecting points of the valves. Due to the oversize length of the resin tube the connection tube portions of the cut valves are arranged to shift from a straight line of connecting a center of the cut valve and a center of the pipe joint by a predetermined and fixed angle in a horizontal direction.

German utility model publication DE 200 11 883 U1 discloses a vent pipe for filling or ventilation of a motor vehicle tank, the ends of which are corrugated.

It is an object of the present invention to provide a fuel tank and a method for the production thereof which allows equalizing distortions of the fuel tank due to shrinkage and which avoids to introduce tension into the connecting points of the internal venting lines of the fuel tank.

The invention can be summarized by stating that it is provided according to the invention to arrange the line such that an evasive movement of the line as a result of changes in length of the line itself or as a result of a shortening of the distance between the connection points because of shrinkage of the fuel tank during the curing of the plastic is allowed and a diversion of a tendential buckling movement of the line concerned is provided. The resultant compensating movement is allowed in an approximately horizontal plane in the fuel tank (with reference to its fitted position); by contrast, a compensating movement of the line in the direction of the force of the weight is not allowed.

It can be seen as a particular advantage of the solution according to the invention that, with the fuel tank according to the invention, it is even possible after completion of the fuel tank to make allowance for changes in length of the line, which are caused for example by swelling of the line in the presence of fuel.

The line is supported at least by means of at least one holding element between the connection points, that the holding element is attached to the tank wall and that the line is arranged such that it can be displaced and/or deflected in relation to the holding element approximately transversely to the direction of the force of the weight. In the simplest case, the holding element may be formed as a bracket, through which the line is displaceably led, the bracket preventing sagging of the line, but nevertheless allowing a compensating movement in the longitudinal direction of the line.

It is provided that the holding element is attached rotatably to the tank wall. The line may for example be held in the holding element at a distance from the point of rotation or axis of rotation of said element, so that any evasive movement or buckling movement of the line as a result of changes in length or as a result of a shortening of the distance between the connection points has the effect that it is converted into a rotational movement of the holding element.

It is provided that the line has at least one portion which extends at least for a portion on a radius with respect to an axis of rotation of the holding element or tangentially in relation to a radius with respect to an axis of rotation of the holding element.

For example, the line may have at least one arc portion which extends in a plane transversely to the direction of the force of the weight and at least partially predetermines an evasive movement of the line in this plane, so that a directed diversion of the "buckling" of the line takes place.

According to a variant of the fuel tank according to the invention, it is provided that a connecting piece rotatably attached to the container wall is provided as the holding element. This connecting piece may for example take the form of an elbow or manifold, which has at least two connection nipples, onto which an end of the line is respectively fitted. In the case of a more complex and more branched line arrangement, such a connecting piece may also have more than two connection nipples and be formed for example as a cruciform or radial manifold.

According to another alternative variant of the fuel tank according to the invention, it is provided that the line comprises at least one corrugated tube portion, which is flexurally rigid about at least a first spatial axis and flexible about at least a second spatial axis, the first spatial axis extending in the direction of the force of the weight in the fitted position, so that an evasive movement or a bending of the line in a plane approximately transversely to the direction of the weight of the force is allowed, but sagging is not allowed.

One aspect of the invention refers to a method for producing a fuel tank from thermoplastic material, the method comprising the production of preforms in web form, the re-shaping of the preforms, preferably still molten from the extrusion, in a first step to form a shell-shaped intermediate product and in a second step to form a one-piece, closed tank, at least one line being joined onto at least one shell-shaped, plastic intermediate product, on the side forming the tank inner wall, at at least two connection points, the line being introduced into the tank and joined essentially without any tension, and the line being secured at at least one location between its connection points against the force of the weight acting in the fitted position to prevent sagging such that the line undergoes a deflection approximately transversely to the direction of the force of the weight when there is a shortening of the distance between the connection points and/or when there is an increase in length.

The production of preforms in web form as defined by the invention may take place by means of known extrusion heads, from which multi-layer extrudates in the form of sheets or webs are provided. The sheets or webs may be provided by cutting open and spreading out tubular preforms, also alternatively by extruding webs from slot dies.

It is alternatively possible to produce the preforms by heating up or plastifying semifinished products in the form of panels.

The fuel tank according to the invention preferably consists of a plastic based on HDPE with one or more barrier layers for hydrocarbons, for example in the form of EVOH layers.

The joining of the line at the connection points may take place for example by riveting and/or welding or by so-called in situ riveting, connection elements with attachment feet being pressed against the warm-plastic wall of the shell-shaped intermediate product at the connection points such that the plastic passes through and flows behind through-openings in the feet and thus a frictionally engaging anchorage of the connection points or connection components takes place. Refueling venting valves, operational venting valves or rollover valves (rollover safety valves), which preferably comprise valve housings of plastic to which the line is connected, for example by means of correspondingly formed pins or nipples, may be provided for example at the connection points of the line.

For the purposes of the invention, a closed tank should not necessarily be understood as meaning a hermetically sealed tank; rather, it may for example have an inspection opening for receiving a fuel feed pump or a so-called feed module.

With the method according to the invention, it is provided that, while forming at least one arc, the line is led through at least one holding element, preferably in the form of a holding clip, with respect to which the line is displaceable or rotatable.

Alternatively, the line may be attached to a rotatable holding element at a distance from an axis of rotation of the holding element. As already mentioned at the beginning, instead of a rotatable holding element, a rotatable connecting piece for two or more lines may be attached to the tank wall.

Figure 2:
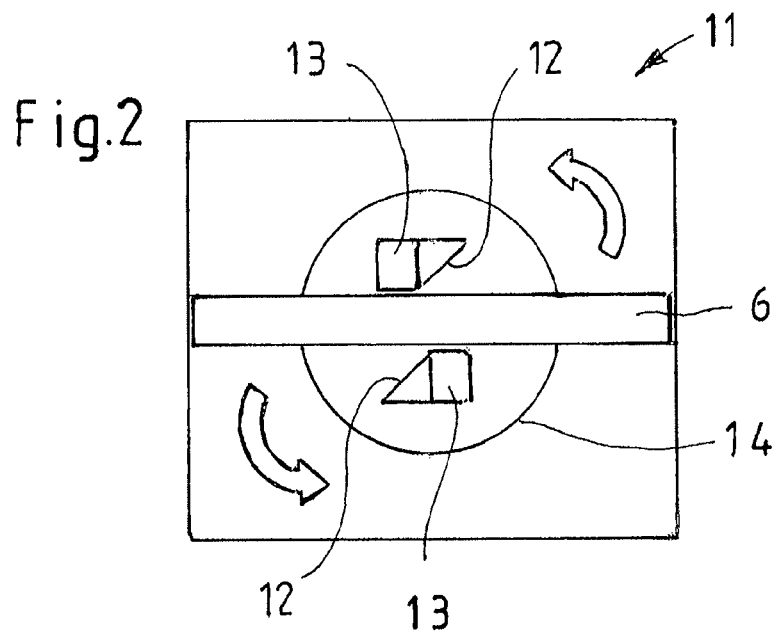
Figure 3:
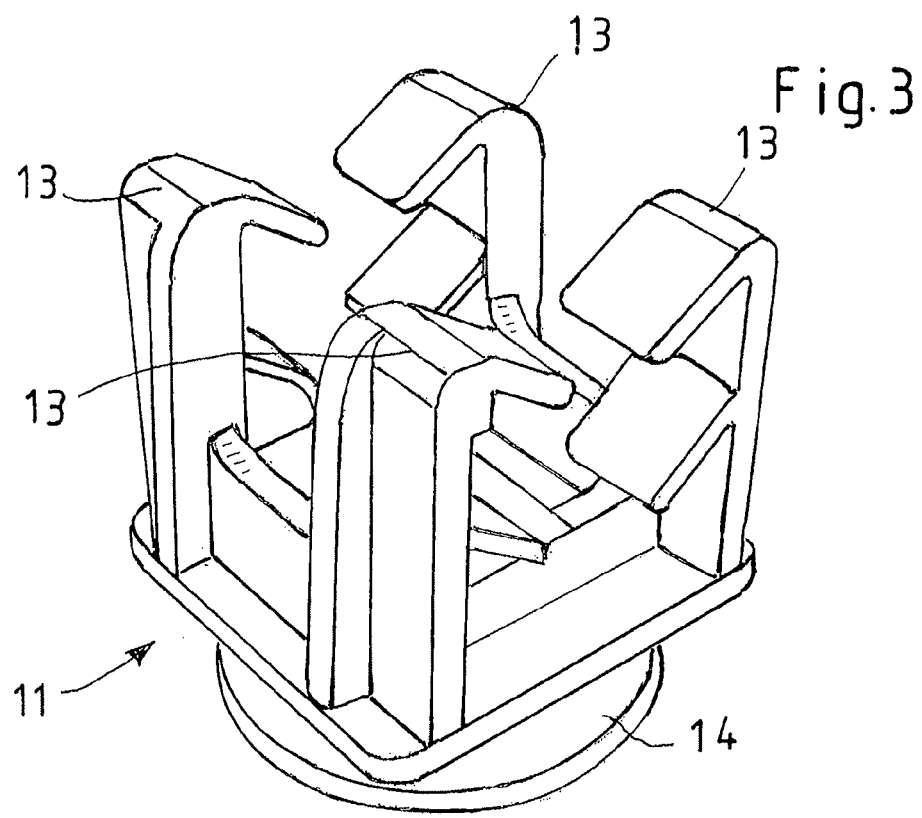

The invention is explained below on the basis of an exemplary embodiment that is represented in the drawings, in which:

FIG. 1 shows a schematic plan view of a fuel tank according to a first exemplary embodiment of the invention, the tank wall that is facing the viewer having been omitted for reasons of a simplified representation, FIG. 2 shows a schematic representation of a holding element for a line, FIG. 3 shows a perspective view of an alternative configuration of the holding element for the line, FIG. 4 shows a plan view of the fuel tank according to the invention as provided by a further variant of the invention, FIG. 5 shows a variant of the holding element according to the invention as a connecting piece for a number of lines, FIG. 6 shows a basic representation of a line arrangement which is connected to a rotatable holding element, and FIGS. 7 to 9 show a line as provided by a further variant of the fuel tank according to the invention.

FIG. 1 shows a fuel tank 1 of thermoplastic material, which is formed in a known way as a saddle tank and comprises two part-volumes 1a, 1b, which are connected to one another by means of a constriction 2. 3 denotes a feed unit, which is inserted in the fuel tank 1 and comprises in a known way a surge chamber with a fuel pump arranged therein and a connected lever-type sensor 4. The feed unit 3 is inserted through an opening provided in the tank wall into the fuel tank 1 and secured on a flange ring (not represented) by means of a cap screw fitting 5.

Also connected to the fuel tank 1 in a known way is a filling tube, which is not represented in the drawing.

Arranged inside the fuel tank as a line as defined by the invention is a system of branched venting lines 6, the venting lines 6 forming a spider of lines, which comprises a refueling venting line 6a and operational venting lines 6b. The operational venting lines 6b are respectively connected at the ends to operational venting valves 7b, the refueling venting line 6a is connected at the end to a refueling venting valve 7a and to a bubble section 8. The bubble section 8, the refueling venting valves 7a and the operational venting valves 7b form fixed connection points for the venting lines 6 in the fuel tank 1.

Although reference is only made above to venting lines 6, the attachment concept explained below is also applicable to other lines, such as for example electrical lines or else hydraulic lines/fuel lines.

The operational venting valves 7b, the refueling venting valve 7a and the bubble section 8, forming the connection points, are respectively connected to the tank wall with a material bond and/or frictional engagement, for example welded or riveted, by means of an attachment support 9. The attachment support 9 may for example be provided for this purpose with attachment openings 10, which are passed through by the plastic of the tank wall during the joining of the line arrangement.

The production of the fuel tank 1 according to the invention takes place by extruding or providing two preforms in web form, which are re-shaped in a multi-part extrusion blow-molding tool comprising a central tool or adjoining frame to form a one-piece closed hollow body of thermoplastic material. In a first step, the preforms are brought to bear in two part-cavities of the blow-molding tool by means of positive pressure and/or a vacuum. This molding of shell-shaped semifinished products may be performed for example by closing the blow-mold halves against a central tool, a core or a component carrier. This is followed by the drawing or blowing of the preforms into the blow-mold halves, which define the outer contour of the half-shells forming the fuel tank 1. Then, by means of a separate component carrier or by means of the central tool or by means of the core, at least the previously described line arrangement, that is to say the venting lines 6 with the valves located on them in the form of operational venting valves 6b, refueling venting valves 7a, bubble sections 8 and the like, are joined onto a still warm-plastic preform that has been molded into a half-shell.

In a further method step, the tool is opened, the central tool or the component carrier is removed from the blow-molding tool and the halves of the blow-molding tool are closed against one another, so that the half-shells are joined together or welded to form the closed fuel tank 1. The last method step is preferably carried out by applying positive pressure/blowing pressure inside the cavity formed by the blow-molding tool.

According to the invention, it is provided that, after the molding of the half-shells in cavities of the blow-molding tool, the venting lines 6 are joined as a preassembled spider of lines, with the refueling venting valves 7b, the operational venting valve 7a, the bubble section 8 and possibly other valves arranged on it, onto the side of the still warm-plastic preform that forms the inner side concerned of the fuel tank 1, without any tension, by means of the central tool or a component carrier frame. In the present case, this is the side of the fuel tank 1 that is facing the viewer and not represented in FIG. 1.

For the purposes of this application, without any tension means that, when the line arrangement is introduced into or joined onto the preform previously molded into a half-shell, the individual inserts arranged at the ends of the refueling venting line 7a and the operational venting line 6b, which form the connection points of the lines, are kept at a distance from one another that would be assumed by the parts if the line arrangement were arranged on an underlying surface such that it is free from forces and freely displaceable.

Both the refueling venting line 6a and the operational venting line 6b consist of a plastic that has a certain intrinsic stiffness in such a way that the lines assume and maintain the contour represented in FIG. 1 or the shape represented there.

As FIG. 1 reveals, the refueling venting lines 6a and the operational venting lines 6b have a shape that is adapted to the geometry of the fuel tank 1 and may differ according to the tank.

As already mentioned at the beginning, during the cooling down of the thermoplastic material the fuel tank 1 undergoes a certain shrinkage, which is approximately of the order of 3%. This means that, for example, the distance of two connection points, for example in the form of operational venting valves 7b, from one another is significantly shortened after the cooling down of the tank, which would inevitably have the consequence of an evasive movement of the operational venting line 6b arranged in between. Sagging of the operational venting line 6b in the direction of gravitational force or the direction of the force of the weight (in FIG. 1 into the plane of the drawing) could have the consequence for example that the operational venting line 6b comes into contact with the lever-type sensor 4, which is absolutely undesirable.

In addition, siphoning of the operational venting line 7b could occur, which is likewise undesirable because the venting function of the fuel tank 1 could then be impaired by fuel collecting there.

According to the invention, the venting lines 6 of the fuel tank 1 are therefore laid such that, if there is a shortening of the distance between the connection points, an evasive movement is allowed in a plane approximately transversely to the direction of the force of the weight (in FIG. 1 in the plane of the drawing).

According to an exemplary embodiment of the invention (FIG. 1), it is for example envisaged for this purpose to underpin for example the refueling venting line 6a by means of a holding element formed as a holding clip 11. For the purposes of this application, underpinning does not mean that the venting line is engaged completely from below, but rather the holding clip 11 is open on the tank side, so that for example the venting line 6 can be subsequently pressed into the holding clip 11 already joined onto the tank wall. The holding clip 11, which is likewise joined onto the tank wall, is formed, in the way represented in FIG. 2, such that it allows two further degrees of freedom of movement for the venting line 6, to be specific a displacement of the venting line in its longitudinal direction and a rotational movement within the holding clip 11. A rotational movement of the venting line is made possible by lateral, beveled guiding faces 12 of the holding arms 13 of the holding clip 11.

An alternative configuration of the holding clip 11 is represented in FIG. 3. The holding clip 11 according to this variant comprises holding arms 13, which engage behind or under the venting line 6 and set their distance from one another such that a rotational movement of the venting line within the holding clip 11 is not possible. The distance of the holding arms 13 from one another is made to match the diameter of the venting line 6 such that the venting line 6 can move freely in its longitudinal extent within the holding clip 11. In order to allow a tendential buckling movement or evasive movement of the venting line 6, the holding clip 11 is arranged rotatably on a support 14, so that the entire venting line 6 can move about the axis of rotation thereby defined, to be precise in the plane extending transversely to the direction of the force of the weight. Such a rotational movement is predetermined by the venting line 6 being led through the holding clip 11 in the form of an arc, so that the length compensation is taken up by the changed radius of the arc of the line.

It should be mentioned once again at this stage that not only is there a change in the distance between the connection points of the venting line 6 due to the shrinkage of the fuel tank, but also the venting line 6 undergoes swelling in the presence of fuel, which occurs later during the operation of the fuel tank 1. The swelling leads to a change in length of the venting line 6, which is likewise compensated in this way.

A further variant of the fuel tank 1 according to the invention is represented for example in FIGS. 4 and 5. Arranged as a holding element on the inside of the tank wall of the fuel tank 1 is a rotatable connecting piece 15, which has altogether four connection nipples 16 for four portions of the venting line 6.

The connecting piece 15 is arranged rotatably on a support 14, for example snap-fitted onto it, and is formed as an approximately cruciform pipe connector for the venting lines. Neighboring connection nipples 16 respectively extend at 90-degree angles in relation to one another, the connection nipples 16 respectively forming the corners of the approximately square connecting piece 15, so that the line continuations thereby formed are arranged in a cruciform manner and respectively run at a distance from the axis of rotation 17. The connecting piece 15 is consequently formed as a cruciform or radial connector, which is rotatable about the axis of rotation 17, so that all four venting lines 6 that are connected to the connecting piece 15 and are respectively laid in the form of an arc can perform an evasive movement predetermined by the arc of the line, the evasive movement being converted into a rotational movement of the connecting piece 15, with the consequence that the radius of the line arcs concerned changes. The connecting piece 15 is formed as a piece of line.

The underlying principle is represented for example in FIG. 6 in a simplified form.

A further variant of the fuel tank 1 is finally represented in FIGS. 7, 8 and 9.

Only a portion of a venting line 6, which is formed as a corrugated tube portion 18, is represented in FIGS. 7 and 9, the corrugated sheet portion 18 being designed such that the venting line 6 can bend in a plane transversely to the direction of the force of the weight, but is rigid in the direction of the force of the weight. As revealed by the cross-sectional representation in FIG. 8, this is accomplished by a continuous stiffening rib 19 being respectively provided at the diametrically opposing 0 and 180° positions of the venting line in the direction of the force of the weight in the fitted position.

This "monodirectional corrugated tube" may for example be provided in the one or other portion of the venting line 6 in addition to the previously described holding elements. Alternatively, it is possible to provide such a formation of the venting line 6 with corrugated tube portions 18 instead of corresponding holding elements.

It goes without saying that all of the attachment concepts described above can be realized individually or in combination on a fuel tank 1 according to the invention.

DESIGNATIONS

1 Fuel tank
1a, 1b Part-volumes
2 Constriction
3 Feed units
4 Lever-type sensor
5 Cap screw fitting
6 Venting lines
6a Refueling venting line
6b Operational venting line
7b Operational venting valves
7a Refueling venting valves
8 Bubble section
9 Attachment support
10 Attachment openings
11 Holding clip
12 Guiding faces
13 Holding arms
14 Support
15 Connecting piece
16 Connection nipple
17 Axis of rotation
18 Corrugated tube portion
19 Stiffening rib

What is claimed is:

1. A fuel tank for motor vehicles comprising:
the fuel tank formed of a thermoplastic material,
at least one line of thermoplastic material, which extends at least between two fixed connection points on a tank wall inside the tank,
wherein the at least one line is supported between the two fixed connection points to prevent sagging against a direction of gravity acting on the at least one line in a fitted position,
wherein the at least one line is supported at least by at least one holding element between the two fixed connection points,
wherein the at least one holding element is attached to the tank wall,
wherein the at least one line is displaceable and/or deflectable transversely to the direction of gravity acting on the at least one line,
wherein the at least one holding element is attached rotatably to the tank wall, wherein the at least one holding element is rotatable about an axis of rotation, and
wherein the at least one line and the at least one holding element cooperate such that a shortening of a distance between the two fixed connection points and/or an increase in a length of the at least one line brings about a corresponding compensating movement of the at least one line transversely to the direction of gravity acting on the at least one line and a rotational movement of the at least one holding element about the axis of rotation.

2. The fuel tank as claimed in claim 1, wherein the at least one line has at least one arc portion which extends in a plane transversely to the direction of gravity acting on the line and at least partially predetermines an evasive movement of the at least one line in the plane.

3. The fuel tank as claimed in claim 1, wherein the at least one holding element comprises a connecting piece rotatably attached to the container wall.

4. The fuel tank as claimed in claim 1, wherein the at least one line comprises at least one corrugated tube portion, which is flexurally rigid about at least a first spatial axis and flexible about at least a second spatial axis, the first spatial axis extending in the direction of gravity acting on the line in the fitted position.

5. The fuel tank as claimed in claim 1, wherein the at least one line is a venting line, line, electrical line, a hydraulic line or a fuel line.

6. A fuel tank for motor vehicles comprising:
the fuel tank formed of a thermoplastic material,
at least one line of thermoplastic material, which extends at least between two fixed connection points on a tank wall inside the tank,
wherein the at least one line is supported between the two fixed connection points to prevent sagging against a direction of gravity acting on the at least one line in a fitted position,
wherein the at least one line is supported at least by at least one holding element between the two fixed connection points,
wherein the at least one holding element is attached to the tank wall and
wherein the at least one line is displaceable and/or deflectable transversely to the direction of gravity acting on the at least one line,
wherein the at least one holding element is attached rotatably to the tank wall, wherein the at least one holding element is rotatable about an axis of rotation,
wherein the at least one holding element is rotatable about the axis of rotation in response to a movement of the at least one line transversely to the direction of gravity acting on the at least one line.

* * * * *